United States Patent [19]

Silence

[11] 4,191,562

[45] Mar. 4, 1980

[54] WEAR-RESISTANT NICKEL-BASE ALLOY

[75] Inventor: William L. Silence, Kokomo, Ind.

[73] Assignee: Cabot Corporation, Kokomo, Ind.

[21] Appl. No.: 916,340

[22] Filed: Jun. 19, 1978

[51] Int. Cl.² .............................................. C22C 19/05
[52] U.S. Cl. .................................... 75/122; 75/134 F; 75/171
[58] Field of Search ...................... 75/134 F, 171, 122

[56] References Cited

U.S. PATENT DOCUMENTS 3,068,096   12/1962   Elbaum et al. .......................... 75/171

*Primary Examiner*—R. Dean

*Attorney, Agent, or Firm*—Joseph J. Phillips; Jack Schuman

[57] ABSTRACT

Disclosed is a nickel-base alloy typically containing in weight percent, about 2.7 carbon, about 10.5 cobalt, about 27 chromium, about 23 iron, about 10 molybdenum plus tungsten, up to 2.5 maximum tungsten, and the balance nickel and incidental impurities. The alloy is especially suited for use as wear-resistant articles and may be produced in various forms, such as castings, metal powder, tube rod and/or wire and wrought articles. The alloy composition is particularly designed to conserve cobalt and tungsten and yet provide wear-resistant articles comparable to cobalt-base alloys with high tungsten contents.

6 Claims, No Drawings

WEAR-RESISTANT NICKEL-BASE ALLOY properties, especially wear resistance. This need continues unabated.

TABLE 1

|  | PRIOR ART ALLOYS In Weight Percent, W/O | | | | | |
|---|---|---|---|---|---|---|
|  | U.S. Pat. No. 3,068,096 | | | HAYNES STELLITE® | | |
|  | DISCLOSURE | CLAIMED | ALLOY 208 | ALLOY 6 | DS-ALLOY F | ALLOY E |
| Chromium | 25–30 | 26 | 25.09 | 30 | 25 | 29 |
| Tungsten | 5–12 | 10 | 9.9 | 4.5 | 12.0 | 15 |
| Carbon | .8–1.6 | 1.4 | 1.55 | 1.7 | 1.75 | 2.4 |
| Silicon | 1.5 max | 0.7 | .50 | 2 max | 0.7 | 0.7 |
| Manganese | 2.0 max | 0.2 | .22 | 2 max | — | — |
| Cobalt | 12 max | 10 | 9.48 | about 60 | 18 | 10 |
| Nickel | Bal 20 min | Bal | 29.80 | 3 max | 22 | 39 |
| Iron | 10–17.5 | 12.5 | 13.18 | 3 max | 20 | 6.5 max |
| Molybdenum | 5–12 | 10 | 10.30 | 1.5 max | — | — |

This invention relates to a wear-resistant nickel-base alloy; and, more specifically, to a wear-resistant alloy especially suited for hardfacing substrate metal articles.

Hardfacing of metal articles has been used for many years to provide superior wear resistance to the articles. The alloys used for hardfacing generally have been cobalt base containing chromium and tungsten for optimum wear resistance. HAYNES STELLITE®* Alloy No. 6 is well known in this art. Cobalt and tungsten appear to provide the exceptional hot hardness properties and other characteristics necessary for wear resistance. Tungsten and cobalt are critical strategic materials in the U.S. economy. Because of this, it is vital that we conserve these metals in every effective way.

*HAYNES STELLITE is a registered trademark of Cabot Corporation.

Table 1 shows representative prior art alloys of the class of this invention. All compositions herein are expressed in weight percent, W/O.

U.S. Pat. No. 3,068,096 discloses castings made from a nickel-base wear-resistant alloy. The patented alloy requires a significant content of tungsten as an essential feature of the patented alloy, as shown in Table 1. Alloys A and B discussed in the patent require even higher tungsten contents.

Also known in the art are alloys DS-Alloy F and Alloy E, as described in Table 1. These alloys are available as a cast rod for hardfacing applications. These alloys also require substantial contents of tungsten and cobalt and are free of molybdenum content.

The market for alloys of this class has been very active since the invention of HAYNES STELLITE Alloy No. 6 by Elwood Haynes more than seventy years ago. There are many alloys now available; however, new alloys are avidly being sought constantly. For many years there has been an urgent need in this art for alloys that are low in cost and strategic element content, readily produced and providing superior engineering properties, especially wear resistance. This need continues unabated.

It is a principal object of this invention to provide a nickel-base alloy that effectively replaces a significant content of cobalt and tungsten and provides superior wear characteristics when compared to well-known cobalt alloys.

It is another principal object of this invention to provide a nickel-base alloy that has essentially similar hardness and engineering properties when compared to well-known cobalt alloys.

Other benefits and objectives are readily apparent within this specification and in the claims.

These and other benefits and objects are provided by the alloy of this invention as defined in Table 2.

Cobalt may be present in the alloy of this invention within the range given in Table 2 to enhance the hot hardness characteristics of the alloy. Cobalt contents near the lower limits are preferred and recommended to conserve this metal. Contents above 15% do not appear to provide enough benefits to justify the higher costs.

Tungsten is not required in the alloy of this invention. It may be present adventitiously only as an impurity common in alloys of this class. To permit the use of some scrap material, tungsten may be present up to 4.5% and preferably not over 4% and typically at about 2.5%. In some alloys, both tungsten and molybdenum are required; commercially known Alloy 208 as disclosed in U.S. Pat. No. 3,068,096 is an example. The alloy of this invention does not require both tungsten and molybdenum to be present in critical contents.

Iron must be present in the alloy of this invention within the ranges given in Table 2 to obtain the best combination of useful engineering properties with the lowest use of higher cost and strategic element content in the alloy. Lower contents of iron will increase costs while higher contents of iron will tend to reduce the wear-resistant properties of the alloy. Thus, the recommended range of iron content is a critical feature of this invention.

TABLE 2

| | ALLOY OF THIS INVENTION In Weight Percent (W/O) | | |
|---|---|---|---|
| | BROAD RANGE | PREFERRED RANGE | TYPICAL EXAMPLE |
| Carbon | 2.0 to 3.5 | 2.3 to 3.0 | 2.7 |
| Cobalt | 7 to 15 | 7.5 to 15 | 10.5 |
| Chromium | 20 to 35 | 25 to 30 | 27 |
| Iron | 20 to 30 | 20 to 27 | 23 |
| Mo + W | 5.5 to 16 | 8 to 16 | 10 |
| Molybdenum | 5 to 16 | 5 to 16 | 8 |
| Tungsten | 4.5 max | 4 max | 2.5 max |
| Silicon | up to 1.5 | .3 to 1.5 | 0.7 |
| Manganese | 1.0 max | 1.0 max | 0.4 |
| Nickel plus | | | |

TABLE 2-continued

ALLOY OF THIS INVENTION
In Weight Percent (W/O)

| | BROAD RANGE | PREFERRED RANGE | TYPICAL EXAMPLE |
|---|---|---|---|
| incidental impurities | Balance | Balance | Balance |

TABLE 3

EXPERIMENTAL ALLOYS OF THIS INVENTION
CHEMICAL COMPOSITIONS, W/O

| | ALLOY 1 | ALLOY 2 | ALLOY 3 | ALLOY 4 | ALLOY 5 | ALLOY 6 | ALLOY 7 | ALLOY 8 |
|---|---|---|---|---|---|---|---|---|
| C | 1.98 | 2.82 | 2.11 | 2.85 | 2.61 | 2.49 | 2.74 | 2.66 |
| Co | 7.75 | 7.34 | 7.03 | 9.06 | 7.97 | 8.93 | 8.81 | 13.72 |
| Cr | 28.89 | 28.82 | 27.47 | 28.53 | 26.85 | 29.28 | 28.59 | 25.70 |
| Fe | 22.13 | 22.13 | 26.40 | 21.90 | 22.70 | 22.78 | 20.90 | 21.18 |
| Mn | .44 | .43 | .44 | .28 | .46 | .36 | .40 | .10 |
| Mo | 5.97 | 6.03 | 5.98 | 5.00 | 5.67 | 5.57 | 5.79 | 9.63 |
| Ni | 28.08 | 27.88 | 27.58 | 28.22 | 29.32 | 28.19 | 28.23 | 22.26 |
| P | .023 | .024 | .021 | .011 | .018 | .008 | .005 | — |
| S | .009 | .010 | .009 | .012 | .008 | .016 | .015 | — |
| Si | .95 | .91 | .86 | .79 | .72 | .93 | .83 | .61 |
| W | 2.56 | 2.62 | 2.38 | 2.46 | 2.39 | <.10 | 2.43 | 2.43 |

Carbon appears to be a critical element in the alloy of this invention. Carbon must always be present over 2% and preferably over 2.3% and typically at 2.7% for maximum benefits of the alloy. Carbon may be present up to 3.5% and preferably at about 2.7%. Carbon is essential to provide the optimum combination of engineering characteristics. It appears that carbon, at the level required herein, is in sufficient quantity to form the necessary metal carbides in the alloy. Carbon is combined with the molybdenum, iron, chromium, cobalt, silicon and other metals to form the carbides in the alloy.

Molybdenum must be present in the alloy of this invention within the ranges suggested. Tungsten is not interchangeable with molybdenum, in this case. Molybdenum is in the alloy to provide molybdenum carbides and contribute to solid solution hardening of the metal matrix.

The alloy of this invention may contain various contents of other elements including boron, tantalum, columbium, copper, vanadium, and the like, to improve certain characteristics as is well known in the art. These elements may be present as deliberate additions or they may be present as adventitious elements in the raw materials used in the alloying step.

It appears, therefore, that this invention resides essentially in the specific combination and contents of elements as taught herein. The elements in the alloy of this invention have all been in various combinations and contents in prior art alloys. Although the exact mechanism is not completely understood, it is believed that the specific compositions disclosed in Table 2 produces an optimum combination of alloy metal structure. and engineering properties, in some unexpected manner.

The subject of wear resistance in metals is generally related to hardness. However, this concept is not necessarily always true. Experimental alloys of this invention have been tested for hardness, abrasive wear, adhesive wear, and other engineering properties.

The hardness testing was conducted with the use of the well-known Rockwell testing machines. The hardness has been obtained in the Rockwell "C" scale, unless otherwise stated, for room temperature hardness tests.

The abrasive wear test, as discussed herein, was conducted with the use of a dry sand wear test unit as described in the "ASME 1977 Proceedings", Wear of Materials, Page 77, ASME, 345 East 47th St., New York, New York 10017. Briefly, in this test, the specimen is forced against a rotating rubber wheel while dry sand is fed between the specimen and the wheel. Metal loss from the specimen surface is measured to determine wear characteristics. The standard test covered 4720 sliding feet.

The adhesive wear test, as discussed herein, was performed on a Model LFW-1 Friction and Wear Test Machine manufactured by Fayville-LaValley Corporation, Downers Grove, Illinois. The test is described in ASTM Specification No. D-2714-68. This testing process was originally known as the "Dow Corning" Wear Test. The adhesive test relates essentially to metal-to-metal wear. Briefly, in this test, a specimen (block) is forced under various loads against a rotating metal wheel (ring). Metal loss from the wear surface is an indication of the metal-to-metal wear characteristics of the alloy tested.

The alloy of this invention may be made in the form of castings for use as articles in wear-resistant applications. The alloy of this invention may be in the form of metal powder for processing into sintered articles, for use in certain hardfacing methods and for other metal powder processes. The alloy of this invention is particularly suited to be in the form of cast or wrought welding and hardfacing rods, electrodes, and the like.

A series of experimental alloys of this invention was made as disclosed in Table 3. The alloys were melted and cast with no particular problem. These alloys do not require any complex processing since they are readily castable. The experimental alloys in Table 3 (except Alloys 4 and 8), were induction melted in vacuum and cast in air. Alloys 4 and 8 were induction melted and aspiration cast into a glass tube (mold) to form a cast weld rod. A sample of commercially available HAYNES STELLITE Alloy No. 6 was also aspiration cast. The composition of HAYNES STELLITE Alloy No. 6 was essentially as given in Table 1.

TABLE 4
HARDNESS AND ABRASIVE WEAR TEST DATA

| | OXY-ACETYLENE | | GAS-TUNGSTEN ARC (TIG) | |
|---|---|---|---|---|
| | Volume Loss, mm$^3$ | Rockwell Hardness C-Scale | Volume Loss, mm$^3$ | Rockwell Hardness C-Scale |
| Alloy No. 4 | 15.1 | 42 | 35.0 | 45 |
| HAYNES STELLITE Alloy No. 6 | 35 | 42 | 58 | 44 |

Table 4 presents hardness and abrasive wear test data for Alloy 4 of this invention, as described in Table 3 and HAYNES STELLITE Alloy 6. Both alloys were aspiration cast into hardfacing rods. Hardfacing deposits were made by oxy-acetylene and TIG processes and tested as indicated. The data show that the alloy of this invention is superior to HAYNES STELLITE Alloy 6.

TABLE 5
HARDNESS AND WEAR TEST DATA (Oxy-Acetylene Deposits)

| | Volume Loss (mm$^3$) | | | |
|---|---|---|---|---|
| | Abrasive Wear | Adhesive Wear | | Hardness |
| | | Block | Ring | |
| Alloy 4 | 14.3 | .08 | .65 | Rc 39 |
| | 14.2 | .06 | .61 | |
| HAYNES STELLITE Alloy No. 6 | 29.4 | .46 | NM* | Rc 38 |
| | 27.3 | .43 | NM | |

*NM = Not Measured

Table 5 presents data obtained from another campaign of testing oxyacetylene deposits of Alloy 4 of this invention and HAYNES STELLITE Alloy No. 6. Aspiration cast rods were deposited and tested as indicated. The adhesive wear test ring was made from case hardened SAE 4620 steel with a hardness of Rockwell C-60. These test data also show the alloy of this invention provides an improvement in the art of hardfacing in metal-to-metal wear properties.

Alloys 1 and 2 of this invention and alloy 208 were tested for oxidation resistance by the test method well known in the art. The oxidation test was conducted at 1800° F. for 100 hours. The air flow was at a rate of 7 cubic feet an hour using desiccated air. The oxidation data in Table 6 show Alloys 1 and 2 had less oxidation penetration and less metal loss when compared to the commercial Alloy 208. Oxidation rates are critical when alloys are used under wear conditions and high temperatures.

TABLE 6
OXIDATION TEST RESULTS
100 hours at 1800° F.

| | Oxidation Penetration (mils) | Metal Loss (mils) |
|---|---|---|
| Alloy 1 | .30 | .34–.37 |

TABLE 6-continued
OXIDATION TEST RESULTS
100 hours at 1800° F.

| | Oxidation Penetration (mils) | Metal Loss (mils) |
|---|---|---|
| Alloy 2 | .40 | .38–.44 |
| Alloy 208 | .77 | .47–.48 |

Hot hardness testing was conducted on Alloy 8 of this invention and HAYNES STELLITE Alloy No. 6. The alloys were aspiration cast into weld rods and deposits were made by oxy-acetylene hardfacing process. Both alloys were tested by the well-known method in a vacuum hardness testing unit using a 1590 gram load with a 136 degree sapphire indentor. Hot hardness data are reported in Table 7 showing the average hot hardness values in diamond pyramid hardness (DPH) numbers. The room temperature values shown in Table 7 were obtained by testing in a Kentron Microhardness Testing Unit using a 1590 gram load with a 136 degree diamond indentor.

These data indicate the alloy of this invention has outstanding hot hardness properties. Hot hardness is an important wear-resistant characteristic. As many possible embodiments as may be made of my invention and as many changes may be made of the embodiments hereinbefore set forth, it will be understood that all matter described herein is to be interpreted as illustrative and not by way of limitation.

TABLE 7
AVERAGE HOT HARDNESS DATA
Values in DPH*

| | Test Temperature, deg. F. (deg. C.) | | | | |
|---|---|---|---|---|---|
| | Room Temp | 800(427) | 1000(538) | 1200(649) | 1400(700) |
| Alloy No. 8 | 428 | 399 | 372 | 320 | 227 |
| HAYNES STELLITE Alloy No. 6 | 418 | 278 | 267 | 257 | 189 |

*DPH = Diamond Pyramid Hardness

What is claimed is:

1. A wear-resistant alloy consisting essentially of, in weight percent, 2 to 3.5 carbon, 7 to 15 cobalt, 20 to 35 chromium, 20 to 30 iron, 5 to 16 molybdenum, up to 4.5 tungsten, 5.5 to 16 molybdenum plus tungsten, up to 1.5 silicon, up to 1 manganese and the balance nickel and incidental impurities.

2. The alloy of claim 1 wherein the carbon is 2.3 to 3, the cobalt is 7.5 to 15, the chromium is 25 to 30, the iron is 20 to 27, the molybdenum plus tungsten is 8 to 16, the tungsten is up to 4, and the silicon is 0.3 to 1.5.

3. The alloy of claim 1 wherein the alloy consists essentially of, in weight percent, about 2.7 carbon, about 10.5 cobalt, about 27 chromium, about 23 iron, about 10 molybdenum plus tungsten, up to about 2.5 tungsten, about 0.7 silicon, about 0.4 manganese and the balance nickel and incidental impurities.

4. The alloy of claim 1 in the form of an article for making hardfacing depositions.

5. The alloy of claim 1 in the form of a casting.

6. The alloy of claim 1 in the form of a cast weld rod for use in hardfacing.

* * * * *